United States Patent
Schmatloch

(10) Patent No.: US 9,920,224 B2
(45) Date of Patent: Mar. 20, 2018

(54) WATER BASED PRIMER COMPOSITION FOR BONDING GLASS INTO A STRUCTURE

(71) Applicant: Dow Global Technologies LLC, Midland, MI (US)

(72) Inventor: Stefan Schmatloch, Thalwil (CH)

(73) Assignee: DOW GLOBAL TECHNOLOGIES LLC, Midland, MI (US)

( * ) Notice: Subject to any disclaimer, the term of this patent is extended or adjusted under 35 U.S.C. 154(b) by 772 days.

(21) Appl. No.: 14/373,785

(22) PCT Filed: Jan. 18, 2013

(86) PCT No.: PCT/US2013/022009
§ 371 (c)(1),
(2) Date: Jul. 22, 2014

(87) PCT Pub. No.: WO2013/116004
PCT Pub. Date: Aug. 8, 2013

(65) Prior Publication Data
US 2014/0367029 A1    Dec. 18, 2014

Related U.S. Application Data

(60) Provisional application No. 61/592,268, filed on Jan. 30, 2012.

(51) Int. Cl.
| | |
|---|---|
| *C08L 83/08* | (2006.01) |
| *C08K 5/00* | (2006.01) |
| *C09J 183/08* | (2006.01) |
| *C09D 183/08* | (2006.01) |
| *C09J 7/02* | (2006.01) |
| *B32B 37/00* | (2006.01) |
| *B32B 37/12* | (2006.01) |
| *E06B 3/56* | (2006.01) |
| *B60J 10/15* | (2016.01) |
| *C08G 77/26* | (2006.01) |

(52) U.S. Cl.
CPC ......... *C09J 7/0257* (2013.01); *B32B 37/0038* (2013.01); *B32B 37/1284* (2013.01); *B60J 10/15* (2016.02); *C08K 5/0091* (2013.01); *C09D 183/08* (2013.01); *C09J 7/50* (2018.01); *E06B 3/56* (2013.01); *B32B 2307/412* (2013.01); *B32B 2419/00* (2013.01); *B32B 2605/00* (2013.01); *C08G 77/26* (2013.01); *C09J 183/08* (2013.01); *C09J 2483/003* (2013.01)

(58) Field of Classification Search
CPC . C09D 183/08; C09J 7/0257; C09J 2483/003; C09J 183/08; C08K 83/08; C08K 5/0091; C08L 83/08
See application file for complete search history.

(56) References Cited

U.S. PATENT DOCUMENTS

| | | | | |
|---|---|---|---|---|
| 4,621,148 | A * | 11/1986 | Barfurth | C07F 7/006 106/448 |
| 4,743,503 | A * | 5/1988 | Lin | C08G 77/58 428/353 |
| 8,673,999 | B2 * | 3/2014 | Schmatloch | C03C 17/322 106/287.11 |
| 2007/0187028 | A1 | 8/2007 | Braun et al. | |
| 2009/0108231 | A1 | 4/2009 | Gimvang et al. | |

* cited by examiner

*Primary Examiner* — David M Brunsman
(74) *Attorney, Agent, or Firm* — The Dobrusin Law Firm, P.C.

(57) ABSTRACT

The present invention is directed to a unique composition and method for promoting adhesion of substrates to adhesives. The solution comprises a water based primer composition comprising: a) a hydrosylate of one or more alkoxysilyl amine; b) a surfactant; c) an organotitanate, organozirconate, or combinations thereof; d) optionally a fluorescing compound; and e) water. Preferably the organotitanate or organozirconate correspond to formula (I): wherein M is titanium or zirconium and $R^8$ comprises hydrocarbyl ligands, which may optionally contain one or more heteroatoms comprising oxygen, nitrogen, sulfur or phosphorus, optionally two or more of $R^8$ may combine to form a cyclic ring structure. Preferably the composition and method of the invention can be used to bond glass or plastic coated with an abrasion resistant coating, in particular a window for a vehicle, to other substrates such as metal or plastics.

$$M(-OR^8)_4 \qquad (I)$$

10 Claims, No Drawings

WATER BASED PRIMER COMPOSITION FOR BONDING GLASS INTO A STRUCTURE

FIELD OF THE INVENTION

The present invention relates to a composition useful as an adhesion promoter for bonding adhesives to substrates, in particular a water based primer composition comprising an organotitanate and/or an organozirconate. The present invention also relates to processes for applying the water based primer composition of the invention to a substrate to improve the adhesion of the adhesive there to.

BACKGROUND

In many industrial adhesive bonding operations an adhesion promoter is applied to a surface to improve bonding of the adhesive to the surface of the substrate. Typical adhesion promoters are delivered dissolved, or dispersed, in an organic solvent. Organic solvents are used because many have low vapor pressures and volatilize away rapidly after application to the substrate. The solvent needs to be removed before application of the adhesive to facilitate bonding of the adhesive to the substrate. Organic solvents are also chosen because the adhesion promoting components typically can be dissolved or dispersed in an organic solvent. The use of organic solvents can result in their release into the environment. However, the use of organic solvents may require expensive ventilation and capturing equipment to reduce the risk of unacceptable human exposure or contamination of the environment.

For the abovementioned reasons there is considerable pressure to replace organic solvents in adhesion promoting systems with water. Adhesion promoters dissolved in or dispersed in water are known; see US Patent Publications 2009/0108231 and 2007/0187028. The use of water presents its own set of problems, including problems with solubility of the ingredients of the adhesion promoter in water and waters relatively high vapor pressure which can result in slow evaporation of water off of a substrate surface. This slow evaporation can slow down industrial processes. In many process the desire is to run the processes as fast as possible. Some of the known processes require special dispensers, complex formulations or process conditions. Water based adhesion promoters can demonstrate poor wetting properties on certain surfaces.

What is needed is a composition which is not complex, avoids the use of organic solvents, can be applied using standard application processes and equipment, accommodate standard industrial processing speeds, wets surfaces well and is environmentally friendly. What is further needed are processes for using such compositions to promote adhesion of adhesives to surfaces.

SUMMARY OF THE INVENTION

The present invention relates to a water based primer composition comprising: a) a hydrosylate of one or more alkoxysilyl amine, preferably in an amount of from 0.05 to 10.0 weight percent based on the total weight of the water based primer composition; b) a surfactant, preferably in an amount of from 0.05 to 1.0 weight percent based on the total weight of the water based primer composition; c) an organotitanate, organozirconate, or combinations thereof, preferably in an amount of from 0.001 to 3.0 weight percent and/or the organozirconate is present in an amount of from 0.001 to 2.0 weight percent wherein the titanate and zirconate weight percent is based on the weight of the titanium and zirconium, respectively; d) optionally a fluorescing compound, preferably in an amount of from 0 to 1.0 weight percent based on the total weight of the water based primer composition; and e) the balance of the composition is water, where in the total weight of the water based primer composition is 100 parts by weight.

In one embodiment, the present invention is the water based primer composition disclosed herein above wherein the one or more alkoxysilyl amines comprise one or more alkoxysilyl alkyl amines, alkoxysilyl polyalkylamines or bis(alkoxysilyl) amines, preferably the alkoxysilyl amines correspond to the formula:

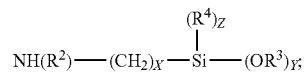

the alkoxysilyl polyalkylamines correspond to the formula:

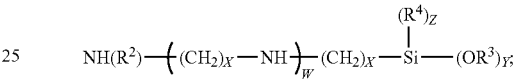

and
the bis(alkoxysilyl) amines correspond to the formula:

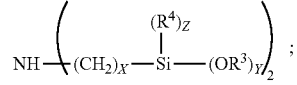

wherein:
$R^2$ is separately in each occurrence a $C_{1-20}$ hydrocarbyl group;
$R^3$ is separately in each occurrence a $C_{1-4}$ alkyl group;
$R^4$ is separately in each occurrence a $C_{1-4}$ alkyl group;
x is separately in each occurrence an integer of from 1 to 4;
y is separately in each occurrence an integer of from 1 to 3; and
z is separately and integer of from 0 to 2 provided that $z=3-y$.

In one embodiment, the present invention is the water based primer composition disclosed herein above wherein the organotitanate or organozirconate correspond to formula:

wherein M is titanium or zirconium and $R^8$ comprises hydrocarbyl ligands, which may optionally contain one or more heteroatoms comprising oxygen, nitrogen, sulfur or phosphorus, optionally two or more of $R^8$ may combine to form a cyclic ring structure, preferably $R^8$ is independently in each occurrence alkylcarboxyl, alkenylcarboxyl, aryl or aralkylsulfonyl, alkylamino, polyalkylamino, phosphatoalkyl, pyrophosphato-alkyl or two or more of $R^8$ may combine to form an alklyene or carbonyl alkylene containing ring, and more preferably the organotitanate or organozirconate is selected from isopropyl triisostearoyl titanate, isopropyltri(dodecyl)benzene sulfonyl titanate, isopropyl tri(n-ethylenediamino)ethyl titanate, octylene glycol titanate, (tetrakis) 2-ethylhexane-1,3-(diolato) titanate, 2-ethylhexyl titanate, dihydroxybis(ammonium-lactato)titanium, tetrakis(triethanolaminato)titanium(IV), or tetrakis(triethanolaminato)zirconium(IV).

In one embodiment, the present invention is a process to use the water based primer composition disclosed herein above comprising the steps of:
  i) applying a water based primer composition to a surface of a first substrate wherein the water based primer composition comprises:
    a) a hydrosylate of one or more alkoxysilyl amine;
    b) a surfactant;
    c) an organotitanate, organozirconate, or combinations thereof;
    d) optionally a fluorescing compound; and
    e) water;
  ii) wiping the applied composition off of the surface of the first substrate or allowing a major portion of the water in the composition to evaporate off of the surface of the first substrate;
  and
  iii) contacting first substrate with an adhesive and contacting the adhesive to a second substrate such that the adhesive is disposed between the first and the second substrates, wherein the adhesive is applied to the portion of the surface of the first substrate to which the water based primer composition is applied.

In one embodiment, the present invention is preferably the process disclosed herein above wherein the first substrate is glass, glass having a ceramic or organic frit on the portion of the surface which is bonded to a second substrate, plastic, coated plastic, bare metal, coated metal, or pained metal, more preferably the glass substrate is a window and the second substrate is a flange in a vehicle adapted to hold the window in place in the vehicle or the substrate is a window frame in a building.

DETAILED DESCRIPTION OF THE PREFERRED EMBODIMENT

In one aspect, the present invention is a water based primer composition comprising a hydrosylate of one or more alkylsilyl amine, one or more alkoxylated alcohol, one or more organotitanate and/or organozirconate, and water.

The solvent or dispersant used in composition of the invention is water. Preferably the water used is demineralized and deionized. Water is used in a sufficient amount to form a stable solution or dispersion of the other components. Stable as used herein means that the other components of the composition do not precipitate out of the solution or form a separate phase from the water. Preferably, the composition of the invention is stable for 3 months or greater and more preferably for 12 months or greater. For use as an adhesion promoter the amount of water present is that amount which facilitates application and use of the composition as an adhesion promoter. Preferably water is present in the composition when ready for use and used in an amount of 80 weight percent or greater based on the total weight of the water based primer composition, more preferably 90 weight percent or greater, and most preferably 94 weight percent or greater based on the total weight of the water based primer composition. Preferably water is present in the composition when ready for use and used in an amount of 99.9 weight percent or less based on the total weight of the water based primer composition, more preferably 99 weight percent or less, and most preferably 98.75 weight percent or less based on the total weight of the water based primer composition. The composition of the invention can be prepared in the form of a concentrate that can be diluted to the concentrations described above for use, for example in order to reduce transportation costs.

The composition of the invention comprises a hydrosylate of one or more of alkoxysilyl amines. An alkoxy silyl amine is a compound that has one or more alkoxy silyl groups and one or more amines having at least one hydrocarbylene moiety disposed between the alkoxy silyl group and the amine group. Preferably the hydrocarbylene is alkylene or cycloalkylene and most preferably alkylene. Preferably the alkylene group is a $C_{1-4}$ alkylene group, with ethylene and propylene even more preferred and propylene most preferred. The amine can be primary or secondary and may have a hydrocarbyl group bonded to the amine nitrogen. Preferred hydrocarbyl groups on the amine nitrogen are $C_{1-20}$ hydrocarbyl groups, more preferably are $C_{1-20}$ alkyl groups, cyclohexyl and phenyl; more preferably $C_{1-4}$ alkyl groups and most preferably methyl or ethyl groups. Alkoxy silyl groups are groups having a silicon atom bonded to from one to three alkoxy groups, preferably two or three alkoxy groups and more preferably three alkoxy groups. The alkyl groups on the alkoxy moiety are preferably $C_{1-4}$ alkyl, more preferably ethyl or methyl and most preferably methyl. The alkoxy silyl groups may have 1 or 3 alkyl groups bonded to the silicon atom. The alkyl groups bonded to the silicon atom are preferably $C_{1-4}$ alkyl, more preferably ethyl or methyl and most preferably methyl. Hydrolysate as used herein means that a significant portion of the alkoxy groups have been hydrolyzed and removed from recited amines. Without wishing to be bound by this theory it is believed that the hydrolyzed alkoxy silyl amines preferably have most of the alkoxy groups removed and most preferably substantially all of them removed. "Most of" in this context means that greater than 50 mole percent of the alkoxy groups are hydrolyzed away, more preferably greater than 75 mole percent and most preferably greater than 90 mole percent, based on the total alkoxysilyl amines added to the hydrolysis mixture. "Substantially all" in this context means that greater than 95 mole percent of the alkoxy groups are hydrolyzed away and most preferably greater than 99 mole percent, based on the total alkoxysilyl amines added to the hydrolysis mixture. In the hydrolysis process oligomers of the remaining silyl amines may form. In the process for preparing the hydrolyzed alkoxysilyl amines, the alcohols, formed as a result of the hydrolysis of the alkoxy groups, are removed from the reaction mixture. Preferred alkoxysilyl amines include alkoxysilyl hydrocarbyl amines, alkoxysilyl polyhydrocarbylamines and bis(alkoxysilyl)hydrocarbyl amines. Alkoxysilyl amines comprise a siloxy alkyl group bonded to a hydrocarbylene group which is further bonded to an amine which may optionally have a hydrocarbyl group bonded thereto. Preferably the alkoxysilyl hydrocarbyl amines are alkoxysilyl alkyl Amines which correspond to the formula:

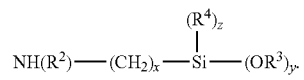

Alkoxysilyl polyhydrocarbylamines are compounds comprising one or more alkoxysilyl groups bonded to a hydrocarbylene group and further bonded to the hydrocarbylene group is a polyalkylpolyamine chain wherein the terminal amine of the polyalkylpolyamine chain may optionally be substituted with a hydrocarbyl group. Alkoxysilyl polyhydrocarbylamines preferably comprise alkoxysilyl polyalkylamines. Preferred alkoxysilyl polyalkylamines correspond to the formula:

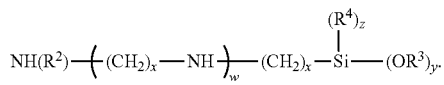

Bis(alkoxysilyl)hydrocarbyl amines comprise two hydrocarbylene alkoxysilyl groups bonded to a the nitrogen of a secondary amine. Preferred bis(alkoxysilyl) hydrocarbyl amines are bis(alkoxysilyl) amines. Preferred bis(alkoxysilyl) amines Correspond to the formula:

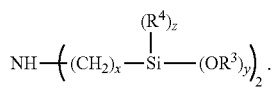

In the formulas provided hereinbefore; $R^2$ is separately in each occurrence a $C_{1-20}$ hydrocarbyl group; $R^3$ is separately in each occurrence a $C_{1-4}$ alkyl group; $R^4$ is separately in each occurrence a $C_{1-4}$ alkyl group; w is separately in each occurrence an integer of from 1 to 10; x is separately in each occurrence an integer of from 1 to 4; y is separately in each occurrence an integer of from 1 to 3; and z is separately in each occurrence an integer of from 0 to 2 provided that z=3−y.

$R^2$ is preferably a $C_{1-20}$ alkyl, cyclohexyl or phenyl group, more preferably a $C_{1-4}$ alkyl group and most preferably methyl or ethyl groups. $R^3$ is preferably ethyl or methyl and most preferably methyl. $R^4$ is preferably $C_{1-4}$ alkyl, more preferably ethyl or methyl and most preferably methyl. Preferably x is 2 or 3 and most preferably 3. Preferably, w is 1 to 4, more preferably 1 to 2 and most preferably 1. Preferably, y is 2 or 3 and most preferably 3. Preferably z is 0 or 1 and most preferably 0.

Among preferred alkoxysilyl alkylamines are 3-aminopropyltrimethoxysilane, 3-aminopropyl-dimethoxymethylsilane, 3-amino-2-methylpropyltrimethoxysilane, 4-aminobutyl-trimethoxysilane, 4-aminobutyldimethoxymethylsilane, 4-amino-3-methylbutyl-trimethoxysilane, 4-amino-3,3-dimethylbutyltrimethoxysilane, 4-amino-3,3-di-methylbutyldimethoxymethylsilane, 2-aminoethyltrimethoxysilane, 2-aminoethyldimethoxymethylsilane, aminomethyltrimethoxysilane, aminomethyldimethoxymethylsilane, aminomethylmethoxydimethylsilane, N-methyl-3-aminopropyltrimethoxysilane, N-ethyl-3-aminopropyltrimethoxysilane, N-butyl-3-aminopropyltrimethoxysilane, N-cyclohexyl-3-aminopropyltrimethoxysilane, N-phenyl-3-aminopropyltrimethoxysilane, N-methyl-3-amino-2-methylpropyltrimethoxysilane, N-ethyl-3-amino-2-methylpropyltrimethoxysilane, N-ethyl-3-aminopropyldimethoxymethylsilane, N-phenyl-4-aminobutyltrimethoxysilane, N-phenylaminomethyldimethoxymethylsilane, N-cyclohexylaminomethyldimethoxymethylsilane, N-methylaminomethyldimethoxymethylsilane, N-ethylaminomethyldimethoxymethylsilane, N-propylaminomethyldimethoxymethylsilane, N-butylaminomethyldimethoxymethylsilane and mixtures thereof. Among preferred alkoxysilyl polyalkylamines are N-(2-aminoethyl)-3-aminopropyltrimethoxysilane and 3-[2-(2-aminoethylamino)ethylamino]propyltrimethoxysilane. Among preferred bis(alkoxysilyl)alkyl amines is bis(trimethoxysilylpropyl)amine.

The hydrolyzed alkoxysilyl amines are prepared by the process disclosed in Standke U.S. Pat. No. 6,534,667 incorporated herein by reference. In general, the process is carried out by hydrolyzing alkoxysilyl amines and removing the resulting hydrolysis alcohols by distillation. Mixing of the alkoxysilyl amines with water can be carried out in a temperature range between the solidifying point and boiling point of the alkoxysilyl amines employed. Generally, water is added in excess to the alkoxysilyl amines for carrying out the hydrolysis. The concentration of the silanes in the aqueous solution is suitably adjusted to a value of less than 60 percent by weight, preferably 0.5 to 40 percent by weight. Deviation from these parameters can cause gel formation or severe clouding. Alcohol is formed on hydrolysis the alkoxysilyl amines. In general, the hydrolysis can be carried out at a temperature in the range from 0° C. to 100° C. Generally, thorough mixing is utilized, for example by stirring. The hydrolysis is suitably carried out at a pH in the range from 4 to 12. An acid or base can be added to the silane mixture or silane mixture/water system or the already hydrolyzed system to establish the pH. Preferably, at least one Brönsted acid is added in the process according to the invention. If necessary, a Brönsted base can also be added, for example potassium hydroxide solution, sodium hydroxide solution and ammonia or amines, to name only a few. Hydrochloric acid, sulfuric acid, nitric acid, perchloric acid, formic acid, acetic acid and/or propionic acid are particularly preferred as the acid. In the process, the concentration of hydrolysis alcohol is furthermore lowered by distillation, the distillation preferably being carried out at a temperature of less than 90° C., particularly preferably at less than 60° C., and suitably under reduced pressure. The distillation can advantageously be carried out via a distillation column and can be continued until no further alcohol can be detected at the top of the column, the desired product, which can optionally be worked up further, being obtained at the bottom. If clouding substances should occur, these can be removed from the product by means of filtration, sedimentation, centrifugation or similar standard processes.

The hydrolyzed alkoxysilyl amines are present in the composition in a sufficient amount to enhance the adhesion of a substrate to an adhesive wherein the composition is stable as described in this application. Preferably the hydrolyzed alkoxysilyl amines are present in an amount equal to or greater than 0.05 weight percent preferably equal to or greater than 0.1 weight percent, more preferably equal to or greater than 0.5 weight percent based on the total weight of the water based primer composition. Preferably the hydrolyzed alkoxysilyl amines are present in an amount equal to or less than 10.0 weight percent, preferably equal to or less than 5.0 part by weight, and more preferably equal to or less than 3.0 weight percent based on the total weight of the water based primer composition.

The composition of the invention may further contain one or more surfactant. Surfactants which can be used include natural or synthetic substances which, in solutions, lower the surface tension of the water or of other liquids. Surfactants which can be used, also called wetting agents, include anionic, cationic, nonionic, and ampholytic surfactants or mixtures thereof.

Examples of anionic surfactants are surfactants containing carboxylate, sulfate, phosphate or sulfonate groups, such as, for example, amino acid derivatives, fatty alcohol ether sulfates, fatty alcohol sulfates, soaps, alkylphenol ethoxylates, fatty alcohol ethoxylates, and also alkanesulfonates, olefinsulfonates or alkyl phosphates.

The nonionic surfactants include, for example, ethoxylates, such as, for example, ethoxylated adducts of alcohols, such as polyoxyalkylene polyols, amines, fatty acids, fatty acid amides, alkylphenols, ethanol amides, fatty amines, polysiloxanes or fatty acid esters, and also alkyl or alkylphenyl polyglycol ethers, such as fatty alcohol polyglycol ethers, or fatty acid amides, alkylglycosides, sugar esters, sorbitan esters, polysorbates or trialkylamine oxides, but also esters and amides of poly(meth)acrylic acids, with polyalkylene glycols or aminopolyalkylene glycols, which may be capped at not more than one end with alkyl groups.

Examples of cationic surfactants are quaternary ammonium or phosphonium compounds, such as tetraalkylammonium salts, N-,N-dialkyl-imidazoline compounds, dimethyldistearylammonium compounds, or N-alkyl-pyridine compounds, especially ammonium chlorides.

The ampholytic or amphoteric surfactants include amphoteric electrolytes, known as ampholytes, such as aminocarboxylic acids, for example, and betaines. Surfactants of this kind are widely available commercially.

Particular suitability is possessed by alkoxylated alcohols. Those which have shown themselves to be suitable include, in particular, alkoxylated nonionic fluorosurfactants, especially ZONYL™ FSO-100, which is available commercially from ABCR, Germany, and alkoxylated alcohols or alkoxylated alkylphenols, especially ANTAROX™ FM 33, which in commercial terms is available commercially from Rhodia.

Additionally very preferred are alkoxylated fatty alcohols, particularly the one commercialized by Cognis as HYDROPALAT™ 120.

Preferably, the surfactant is one of more alkoxylated alcohols, fatty acids or fatty acid esters or mixtures thereof. Fatty acids are carboxylic acids having a long aliphatic chain attached to the carboxylic acid. The aliphatic chain preferably has from 2 to 26 carbon atoms. The aliphatic chain can be fully saturated or contain one or more double bonds. An aliphatic chain having one double bond is monounsaturated and an aliphatic chain having more than one double bond is polyunsaturated. Examples of fatty acids include acetic acid, butyric acid, palmitic acids, linoleic acid, linolenic acid, arachidonic acid, oleic acid, butyric acid, valeric acid, caproic acid, caprylic acid, 2-ethylhexanoic acid, capric acid, lauric acid, myristic acid, palmitoleic acid, stearic acid, isostearic acid, elaidic acid, petroselic acid, elaeostearic acid, conjuene fatty acid, ricinoleic acid, arachic acid, gadoleic acid, behenic acid, erucic acid and brassylic acid. Fatty acids are typically found in plant and animal lipids (fat), such as glycerides, sterols, and phospholipids. A fatty acid ester is the reaction product of a fatty acid and an alcohol. Preferably the alcohol has from 1 to 14 carbon atoms and preferably has only one hydroxyl group. Preferred fatty acids as used herein correspond to the formula:

wherein $R^5$ is separately in each occurrence a $C_{2-26}$ aliphatic chain. Preferred fatty acid esters correspond to the formula:

wherein $R^5$ is as described hereinbefore and $R^6$ is a $C_{1-14}$ aliphatic chain.

The one of more alkoxylated alcohols comprise one or more alcohols having a chain of alkylene oxide groups bonded thereto. The starting alcohol can contain one or more hydroxyl groups, preferably 1 to 6, more preferably 1 to 3 and most preferably 1. The starting alcohols can have from 1 to 20 carbon atoms and preferably have from 1 to 16 carbon atoms, and most preferably 6 to 16 carbon atoms. In one embodiment the starting alcohols comprise a mixture. In a more preferred embodiment the alcohols are a mixture derived from a natural source, such as a seed oil. The alcohols are alkoxylated by replacing the hydroxyl group with one or more chains of one or more alkylene oxide groups. Generally any known alkylene oxides may be reacted with the alcohol to form the alkylene oxide chain. Among preferred alkylene oxides are ethylene oxide, propylene oxide, and butylene oxide. More preferred are ethylene oxide and propylene oxide. The alkylene oxide chains may comprise one or more than one alkylene oxide. Where two or more alkylene oxides are used they may be arranged in blocks or randomly. More preferred alkylene oxide chains include propylene oxide and ethylene oxide. In an even more preferred embodiment, the chain comprises a propylene oxide block bonded to the residue of the alcohol and an ethylene oxide block bonded to the propylene oxide block. The preparation of alkoxylated alcohols is described in U.S. Pat. No. 5,844,115; and WO 2008/088647 (U.S. Ser. No. 12/521,827) incorporated herein by reference. Preferred alkoxylated alcohols are alkoxylated seed oil alcohols including those described in WO 2008/088647 (U.S. Ser. No. 12/521,827) incorporated herein by reference.

Preferred alkoxylated alcohols are described by the formula:

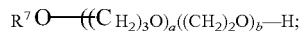

wherein:
$R^7$ is separately in each occurrence a $C_{1-20}$ straight or branched chain alkyl or alkenyl group:
a is separately in each occurrence is an integer of 1 to 3; and,
b is separately in each occurrence an integer of 2 to 10.
Preferably, $R^7$ is a mixture of seed-oil based linear alkyl moieties.

A particularly suitable surfactant is an alkoxy end-capped polypropylene or polyethylene oxide or mixtures in ethers (for example ECOSURF™ grades from The Dow Chemical Co., particularly ECOSURF SA7) and more particularly glass and enamel reactive surfactants such as polyethylenoxide based silane end-capped surfactants, for example, commercially available SILQUEST™ A1230:

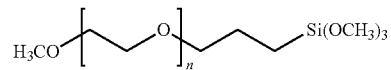

The surfactant is present in a sufficient amount to improve the wetting characteristics of the composition of the invention on the surface of substrates. Preferably, the surfactant (or independently each surfactant if there is more than one) is present in an amount equal to or greater than 0.05 weight percent and preferably equal to or greater than 0.08 weight percent wherein weight percent is based on the total weight of the water based primer composition. Preferably, the surfactant (or independently each surfactant if there is more than one) is present in an amount equal to or less than 1.0 part by weight percent, more preferably equal to or less than 0.12 weight percent wherein weight percent is based on the total weight of the water based primer composition. The composition of the invention can be prepared in the form of a concentrate that can be diluted to the concentrations described above for use. The upper limit on the concentration of the one of more alkoxylated alcohols, fatty acids or fatty acid esters or mixtures thereof in a concentrate is based on the concentration above which the concentrate no longer is stable.

Another component of water based primer composition of the present invention is an organotitanate and/or an organozirconate having four ligands wherein the ligands are hydrocarbyl, optionally containing one or more functional groups having one or more heteroatoms selected from the group comprising oxygen, nitrogen, phosphorus and sulfur. Any two or more of the ligands may be bonded together to form a cyclic ring structure. The cyclic ring structure can contain one or more heteroatoms or heteroatom containing functional groups. Any organotitanate and/or an organozirconate having such ligands which enhances the formation of a durable adhesive bond between an adhesive, preferably an isocyanate functional adhesive and a glass or plastic surface, preferably a coated plastic, may be used. Preferably, the ligands on the titanate/zirconate are hydrocarbyl, hydrocarbyl carboxyl, hydrocarbyl sulfonyl, hydrocarbyl amino, phosphatohydrocarbyl, pyrophosphatohydrocarbyl or a mixture thereof. Two or more ligands may form a hydrocarbylene moiety, or form a carbonyl containing hydrocarbylene moiety. In a more preferred embodiment, the ligands are alkyl, alkenyl, alkylcarboxyl, alkenyl carboxyl, aryl or aralkylsulfonyl, alkylamino, poly(alkylamino), phosphatoalkyl, pyrophosphato-alkyl, alkylene or carbonylalkylene or a mixture thereof. As used herein, "hydrocarbyl" means a monovalent moiety comprising hydrogen and carbon atoms. Hydrocarbylene means a polyvalent hydrogen and carbon containing moiety. The term "optionally containing heteroatom" means that the recited ligand may contain one or more heteroatoms such as nitrogen, sulfur, oxygen or phosphorus. "Alkenyl" means a straight or branched hydrocarbon chain having at least one double bond therein. "Alkyl" means a straight or branched saturated hydrocarbon chain. "Alkylene" means a straight or branched saturated polyvalent hydrocarbon chain. "Aryl" means an aromatic hydrocarbon containing ligand such as phenyl, biphenyl or naphthyl. "Alkaryl" means a ligand which comprises both aliphatic and aromatic structural components; for example, 1,3-propylene diphenyl or nonylphenyl. Arylene as used herein refers to a polyvalent group which comprises aromatic rings such as phenylene, naphthalene or biphenylene. Alkarylene means a polyvalent group which has both aliphatic and aromatic structural components; i.e., such as 1,3-propylene diphenylene or methylene diphenylene. Coated plastic as used herein means plastic coated with an abrasion resistant coating.

Suitable organotitanates and suitable organozirconates of the present invention independently have four ligands wherein the ligands are hydrocarbyl, optionally containing one or more functional groups having one or more heteroatoms selected from the group comprising oxygen, nitrogen, phosphorous, and sulfur wherein two or more of the ligands may form a cyclic structure.

Preferably, the titanates and zirconates used in the invention correspond to formula:

wherein M is titanium or zirconium and $R^8$ comprises hydrocarbyl ligands, which may optionally contain one or more heteroatoms comprising oxygen, nitrogen, sulfur or phosphorus, with the proviso that two or more of $R^8$ may combine to form a cyclic ring structure. Preferably, $R^8$ is independently in each occurrence alkylcarboxyl, alkenylcarboxyl, aryl or aralkylsulfonyl, alkylamino, polyalkylamino, phosphato-alkyl, pyrophosphato-alkyl or two or more of $R^8$ may combine to form an alklyene or carbonyl alkylene containing ring. In one preferred embodiment, $R^8$ comprises an alkylcarboyxl or alkenylcarboxyl moiety corresponding to the formula:

wherein $R^9$ is an alkyl or alkenyl moiety.

In the embodiment wherein $R^8$ is alkyl, aryl or alkarylsulfonyl, $R^8$ preferably corresponds to the formula:

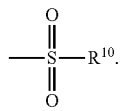

wherein $R^{10}$ is alkyl, aryl or alkaryl.

In the embodiment, $R^8$ is alkylamino or poly(alkylamino), $R^8$ preferably corresponds to the formula:

wherein $R^{11}$ is an alkylene group. Further, m is independently in each occurrence a rational number between and/or including 0 and 3.

In the embodiment wherein $R^8$ is phosphate or pyrophosphato, $R^8$ preferably corresponds to the formula:

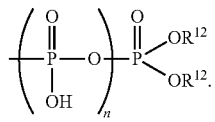

wherein $R^{12}$ is alkyl and n is 0 or 1.

In one preferred embodiment, at least one of $R^8$ is alkyl, more preferably $C_{1-8}$ alkyl, and most preferably isopropyl. Preferably, two or three of the ligands contain heteroatoms and most preferably three of the ligands contain heteroatoms. Preferably, $R^9$ is $C_{2-17}$ alkyl and more preferably $C_{3-8}$ alkyl. Preferably, $R^{10}$ is $C_{2-7}$ alkaryl and more preferably $C_{3-42}$ alkaryl. Preferably, $R^{11}$ is $C_{2-6}$ alkylene, more preferably $C_{2-4}$ alkylene and most preferably $C_{2-3}$ alkylene. Preferably, $R^{12}$ is $C_{2-17}$ alkyl, more preferably $C_{2-8}$ alkyl and most preferably octyl. Preferably m is a rational number of 0 to 3 and more preferably 1 to 2.

Among preferred titanate compounds are isopropyl triisostearoyl titanate available under the designation KR-TTS from Kenrich Chemicals, isopropyltri(dodecyl)benzene sulfonyl titanate available from Kenrich Chemicals under the designation KR-9S, isopropyl tri(n-ethylenediamino)ethyl titanate available from Kenrich Chemicals under the designation KR-44, octylene glycol titanate, (tetrakis) 2-ethylhexane-1,3-(diolato) titanate available from Dorf Ketal under the trademark TYZOR™ OGT, 2-ethylhexyl titanate available from Dorf Ketal, under the trademark TYZOR TOT., tetrakis(triethanolaminato)titanium(IV) available as TYZOR TE from Dorf Ketal, dihydroxybis(ammoniumlactato)titanium available as TYZOR LA from Dorf Ketal, and a tetrakis(triethanolaminato)zirconium(IV) available as TYZOR TEAZ from Dorf Ketal.

The organotitanate and/or organozirconate is present in the water based primer composition in sufficient amount to enhance the durability of the bond between the adhesive (for example, an isocyanate functional adhesive) and the glass.

Preferably, the organotitanate is present in the water based primer in an amount equal to or greater than 0.001 weight percent, preferably in an amount equal to or greater than 0.005 weight percent, and more preferably equal to or greater than 0.01 weight percent wherein the weight percent for the organotitanate is calculated from the weight of the titanium (not the weight of the organotitanate) relative to the total weight of the water based primer composition. Preferably, the organotitanate is present in the water based primer in an amount equal to or less than 3 weight percent, preferably in an amount equal to or less than 1.5 weight percent, and more preferably equal to or less than 1.0 weight percent wherein the weight percent for the organotitanate is calculated from the weight of the titanium (not the weight of the organotitanate) relative to the total weight of the water based primer composition.

Preferably, the organozirconate is present in the water based primer in an amount equal to or greater than 0.001 weight percent, preferably in an amount equal to or greater than 0.005 weight percent, and more preferably equal to or greater than 0.01 weight percent wherein the weight percent for the organozirconate is calculated from the weight of the zirconium (not the weight of the organozirconate) relative to the total weight of the water based primer composition. Preferably, the organozirconate is present in the water based primer in an amount equal to or less than 2 weight percent, preferably in an amount equal to or less than 1.5 weight percent, and more preferably equal to or less than 1 weight percent wherein the weight percent for the organozirconate is calculated from the weight of the zirconium (not the weight of the organozirconate) relative to the total weight of the water based primer composition.

The composition of the invention may further contain a component that fluoresces when illuminated by ultraviolet light. Fluorescing compounds are readily available from numerous sources, for example Aldrich Chemical Co., Milwaukee, Wis. As a specific example, the fluorescing component can be UVITEX OB brand fluorescing agent available from Ciba Specialty Chemicals, Tarrytown, N.Y. (USA). The amount of fluorescing agent added to the composition must be sufficient so that the area of the window treated with the composition is apparent when the window is illuminated with an ultraviolet light.

Preferably, the fluorescing compound is present in the water based primer in an amount equal to or greater than 0.001 weight percent, preferably in an amount equal to or greater than 0.005 weight percent, and more preferably equal to or greater than 0.01 weight percent wherein the weight percent is based on the total weight of the water based primer composition. Preferably, the fluorescing compound is present in the water based primer in an amount equal to or less than 1.0 weight percent, preferably in an amount equal to or less than 0.5 weight percent, and more preferably equal to or less than 0.2 weight percent wherein the weight percent is based on the total weight of the water based primer composition.

The composition of the invention may contain a high molecular weight resin. The high molecular weight resins are present for the purpose of forming a film which provides strength to the composition and/or protects the substrate from environmental attack. Any high molecular weight resin which forms a film upon evaporation of water may be used. The high molecular weight resin can have functional groups which react into the adhesive system or which react with the surface of the substrate. Alternatively, reactive functional groups are not required for the high molecular weight resin to work in the compositions. Examples of useful functional groups are hydroxyl, carboxyl, isocyanato, alkoxysilane, mercaptosilane, epoxy functional groups; and mixtures thereof. Preferred functional groups are hydroxyl, carboxyl, isocyanato, alkoxysilane, isocyanato and mixtures thereof. More preferred functional groups are isocyanato and alkoxysilane. Preferred alkoxysilanes are di- or tri-methoxy silanes. Preferred classes of resins are acrylics, isocyanate functional prepolymers, alkoxysilane resins, and polyesters. Preferred classes of resins are acrylics, isocyanate functional prepolymers and alkoxysilane based resins. More preferred resins are VESTOPLAST™ 206 silanated amorphous polyolefins available from Degussa, SAX 400 and SAT 200 silyl functional polypropylene oxide based polymers available from Kaneka and silane terminated polyurethanes. The resins preferably have a molecular weight which facilitates the formation of a strong film upon evaporation of the solvent. Preferably the high molecular weight resins have an weight average molecular weight of 5,000 or greater, more preferably 10,000 or greater and most preferably 15,000 or greater. Preferably the high molecular weight resins have a weight average molecular weight of 200,000 or less, more preferably 150,000 or less, and most preferably 100,000 or less.

The composition of the invention may further comprise one or more of additive commonly used in such compositions, for example, a stabilizing amount of an organophosphite, a light stabilizer, and an ultraviolet light stabilizer. The organophosphite is preferably present in a sufficient amount to enhance the durability of bond of the adhesive composition to the substrate surface. Preferably at least one of the phosphorous atoms is bonded to an oxygen atom which is bonded to an aromatic moiety, such as a phenyl. Preferably at least one of the phosphorous atoms is bonded to an oxygen atom bonded to an alkyl moiety. Preferably at least one of the phosphorous atoms is bonded to both an aromatic moiety and an alkyl moiety through oxygen moieties. The organophosphites preferred for use in this invention are phosphites wherein the ligands on the phosphite comprise one ligand with at least one aliphatic moiety and one ligand with at least one aromatic moiety or comprises at least one ligand having both aromatic and aliphatic structure; i.e., alkaryl. Ligand as used in this context refers to the groups bound to the oxygens bound to the phosphorous atoms of the phosphite. In a preferred embodiment the phosphite corresponds to the formula:

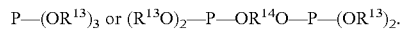

$$P-(OR^{13})_3 \text{ or } (R^{13}O)_2-P-OR^{14}O-P-(OR^{13})_2.$$

Preferably $R^{13}$ is independently in each occurrence $C_{6-18}$ alkyl, $C_{7-30}$ alkaryl or $C_{6-20}$ aryl; more preferably $C_{6-12}$ alkyl and most preferably $C_{9-12}$ alkyl. Preferably $R^{14}$ is independently in each occurrence $C_{6-18}$ alkylene, $C_{7-30}$ alkarylene, or $C_{6-20}$ arylene; more preferably $C_{7-30}$ alkarylene, or $C_{6-20}$ arylene; even more preferably $C_{7-30}$ alkarylene and most preferably a divalent bisphenol structure, for instance 1,3 propylene diphenyl or methylene diphenyl. Preferably the divalent bisphenol is based on Bisphenol A or Bisphenol F. As used herein alkyl means saturated straight or branched carbon chain. Among preferred organophosphites are poly(dipropyleneglycol) phenyl phosphite (available from Dover Chemical Corporation under the designation DOVER-PHOS™ 12), tetrakis isodecyl 4,4'isopropylidene diphosphite (available from Dover Chemical Corporation under the designation DOVERPHOS 675), and phenyl diisodecyl phosphite (available from Dover Chemical Corporation under the designation DOVERPHOS 7). Preferably, the organophosphite is present in the composition of the invention in an amount of 0.01 weight percent or greater and more preferably 0.1 weight percent or greater based on the total weight of the water based primer composition. Preferably the organophosphite is present in the composition of the invention in an amount of 1.0 weight percent or less and more preferably 0.4 weight percent or less based on the total weight of the water based primer composition.

In a preferred embodiment, the composition of the invention may further include a light stabilizer. Any light stabilizer which facilitates the system maintaining durable bond to the substrate for a significant portion of the life of the structure to which it is bonded may be used. Preferred light stabilizers are hindered amine light stabilizers. Hindered amine light stabilizers generally comprise include those available from Ciba Geigy such as TINUVIN™ 144, n-butyl-(3,5-di-ter-butyl-4-hydroxybenzyl)bis-(1,2,2,6-pentamethyl-4-piperidinyl) malonate; TINUVIN 622, dimethyl succinate polymer with 4-hydroxy-2,2,6,6,-tetramethyl-1-piperidine ethanol; TINUVIN 77, bis(2,2,6,6,-tetramethyl-4-piperidinyl) sebacate; TINUVIN 123, bis-(1-octyloxy-2, 2,6,6, tetramethyl-4-piperidinyl) sebacate, TINUVIN 765, bis(1,2,2,6,6,-pentamethyl-4-piperidinyl)sebacate; CHIMASSORB™ 944 poly[[6-[1,1,3,3-tetramethyl-butyl) amino]-1,3,5-triazine-2,4-diyl][2,2,6,6-tetramethyl-4-piperidinyl)imino]-1,6-hexanediyl[(2,2,6-tetramethyl-4-piperidinyl)imino]]) and available from Cytec CYASORB™ UV-500 1,5-dioxaspiro (5,5) undecane 3,3-dicarboxylic acid, bis(2,2,6,6,-tetramethyl-4-piperidinyl) ester; CYASORB UV-3581, 3-dodecyl-1-(2,2,6,6,-tetramethyl-4-piperidyl-pyrrolidin-2,5-dione) and CYASORB UV-3346, poly [(6-morpholino-s-triazine-2,4-diyl) [2,2,6,6-tetramethyl-4-piperidyl)imino]-hexamethylene [(2,2,6,6-tetramethyl-4-piperidyl)imino]]. More preferred hindered light amine stabilizers include TINUVIN 1,2,3 bis-(1-octyloxy-2,2,6,6, tetramethyl-4-piperidinyl) sebacate and TINUVIN 765, bis (1,2,2,6,6,-pentamethyl-4-piperidinyl) sebacate. A sufficient amount of light stabilizer to enhance the bond durability to the substrate may be used. Preferably, the light stabilizer is used in amount of 0.01 weight percent or greater, based on the total weight of the water based primer composition, more preferably 0.02 weight percent or greater and most preferably 0.2 weight percent or greater based on the total weight of the water based primer composition. Preferably, the amount of light stabilizer present is 33 weight percent or less, based on the total weight of the water based primer composition, more preferably 2 weight percent or less and most preferably 1 weight percent or less based on the total weight of the water based primer composition.

In another preferred embodiment, the composition of the invention may further comprise an ultraviolet light absorber. Any ultraviolet absorber which enhances the durability of the bond of the adhesive to the substrate may be used. Preferred UV light absorbers include benzophenones and benzotriazoles. More preferred UV light absorbers include those from Ciba Geigy such as TINUVIN P, 2-(2'-hydroxy-5'-methylphenyl)-benzotriazole; TINUVIN 326, 2-(5-chloro-2H-benzotriazol-2-yl)-6-(1,1-dimethylethyl)-4-methylphenol; TINUVIN 213 poly(oxy-1,2-ethanediyl), (α, (3-(3-(2H-benzotriazol-2-yl)-5-(1,1-dimethylethyl)-4-hydroxyphenyl)-1-oxopropyl)-ω-hydroxy; poly(oxy-1,2-ethyanediyl), (α,(3-(3-(AH-benzotriazol-2-yl)-5-(1,1-dimethylethyl)-4-hydroxyphenyl)-1-oxopropyl)-ω-(α,(3-(3-(2H-benzotriazol-2-yl)-5-(1,1-dimethylethyl)-4-hydroxyphenyl)-1-oxopropyl); TINUVIN 327, 2-(3,5-di-tert-butyl-2-hydroxyphenol)-5-chlorobenzotriazole; TINUVIN 571, 2-(2H-benzotriazol-2-yl)-6-dodecyl-4-methylphenol, branched and linear; TINUVIN 328, 2-(2H-benzotriazol-2-yl)-4,6-bis(1,1-dimethylpropyl)phenol and from Cytec such as CYASORB UV-9,2-hydroxy-4-methoxybenzophenone; CYASORB UV-24, 2,2'-dihydroxy-4-methoxybenzophenone; CYASORB UV-1164, -[4,6-bis(2, 4-dimethylphenyl)-1,3,5-triazin-2-yl]-5-(octyloxy) phenol; CYASORB UV-2337, 2-(2'-hydroxy-3'-5'-di-t-amylphenyl) benzotriazole; CYASORB UV-2908, 3,5-di-t-butyl-4-hydroxybenzoic acid, hexadecyl ester; CYASORB UV-5337, 2-(2'-hydroxy-3',5'-di-t-butylphenyl)-5-chlorobenzotriazole; CYASORB UV-531, 2-hydroxy-4-n-octoxybenzophenone; and CYASORB UV-3638, 2,2-(1,4-phenylene)bis[4H-3,1-benzoxazin-4-one]. More preferred UV light absorbers include CYASORB UV-531 2-hydroxy-4-n-octoxybenzophenone and TINUVIN 571 2-(2H-benzotriazol-2-yl)-6-dodecyl-4-methylphenol, branched and linear. Preferably, the UV light absorber is used in sufficient amount to enhance the durability of the bond of the adhesive to the substrate. Preferably, the UV absorber is used in an amount of 0.01 weight percent or greater, based on the total weight of the water based primer composition, more preferably 0.02 weight percent or greater and most preferably 0.2 weight percent or greater based on the total weight of the water based primer composition. Preferably, the UV light inhibitor is used in amount of 3 weight percent or less based on the total weight of the water based primer, more preferably 2 weight percent or less and most preferably 1 weight percent or less based on the total weight of the water based primer composition.

The components of the composition of the invention are blended in water under conditions such that a stable homogeneous composition is formed. The composition may be prepared to have concentrations of components for final application as described hereinbefore. Stable as used herein with respect to the composition of the invention means that the components remain in solution for a period of three months or greater when stored at ambient temperatures (defined herein as from 20 to 30° C.) and more preferably for a period of 6 months and most preferably for a period of 12 months. This is also known in the art as the shelf life of the composition.

The components may be mixed together at ambient temperature (typically ambient temperature refers to room temperature conditions which may vary but by convention are defined as 23° C.) or at elevated temperature. The order of addition may vary, for example in one embodiment, the hydrosylate of one or more alkoxysilyl amine, surfactant, optional a fluorescing compound, and any additional components may be mixed individually or at the same time into the water followed by the addition of the organotitanate and/or organozirconate. Alternatively, in another preferred embodiment, the organotitanate and/or organozirconate are first mixed into the water and then the additional components (the hydrosylate of one or more alkoxysilyl amine, surfactant, optional a fluorescing compound, and any additional components) are mixed in individually or together. In a third embodiment, one or more component (for example the alkoxysilyl amine and surfactant) may be mixed with a first portion of the water and separately one or more remaining component (for example the fluorescing compound and the zirconate) may be mixed with a second portion of water (e.g., the remainder of the water) then the first and second mixtures may be mixed together to provide the waster based primer composition If one or more of the components are mixed in together, they may first be mixed together to form a masterbatch, then mixed into the water. In the preparation of a mixture, one or more individual component may be added, one or more masterbatch may be added.

In general, the method of bonding glass, coated glass, plastic, coated plastic or a window comprising these materials to a second substrate comprises contacting the water based primer composition of the invention with the surface of the glass or coated plastic. Preferably, the glass and/or plastic is clear. Thereafter, a suitable adhesive is applied to the surface of the glass, coated glass, plastic, or coated plastic, along the portion of the glass, coated glass, plastic, or coated plastic which is to be bonded to the second substrate. The adhesive is thereafter contacted with the second substrate such that the adhesive is disposed between the glass and the second substrate. The adhesive is allowed to cure to form a durable bond between the glass, coated glass, plastic, coated plastic or a window and the substrate. The bonded glass, coated glass, plastic, coated plastic or a window to the second substrate forms a structure.

In some embodiments, the glass or plastic has an opaque coating the perimeter of the glass or plastic to which the water based primer of the present invention is applied. The opaque coating is commonly referred to as a frit. For glass, the coating is an inorganic enamel. The water based primer improves the ability of adhesive systems to bond to such coatings.

The water based primer composition may be applied by any means well known in the art. It may be applied manually by brushing, rolling or applying a cloth containing the composition to the surface of a substrate to which the adhesive will be applied such that a sufficient amount of the primer composition is applied to the surface. In a preferable embodiment, the water based primer composition is applied using a robot. Useful robots for this operation are for example is M710I, available from Fanuc Robotics America, of Rochester Hills, Mich. used with an automated primer dispense applicator supplied by Nordson Corporation, Amherst, Ohio. Preferably, the primer is applied such that there is at least 8 to 20 seconds of dry time after priming. Preferably, the adhesive is applied at least 20 seconds after application of the adhesive. The system of the invention can be used to bond glass or plastic, preferably coated plastic, to other substrates such as metal or plastics. The coated plastic may be coated with an abrasion resistant coating. Suitable plastics are any plastic which is clear, such as polycarbonate, acrylics, hydrogenated polystyrene or hydrogenated styrene conjugated diene block copolymers having greater than 50 percent styrene content. The coating can comprise any coating which is abrasion resistant such as a polysiloxane coating. Preferably, the coating has an ultraviolet pigmented light blocking additive. Preferably, the glass or plastic window has an opaque coating disposed in the region to be contacted with the adhesive to block UV light from reaching the adhesive.

In some embodiments, the adhesive composition is applied to the glass or plastic shortly after application of the water based primer composition. The minimum time between application of the water based primer and application of the adhesive is that time necessary for the water to volatilize away. In some embodiments, the water based primer adhesive composition may be applied in a different location from the location of application of the water based primer, for instance in a different part of the plant or a different plant. Further, the plants can be many miles apart, for instance hundreds or thousands of miles apart. The adhesive composition may be applied much later than the water based primer. In some embodiments, the time between application of the water based primer and application of the adhesive composition can be 5 days or greater, or even 30 days or greater. The time period between application of the water based primer and the application of the adhesive composition can be 90 days or less and preferably 60 days or less.

In another embodiment the invention is a process comprising: a) applying a water based primer composition according to the invention to a surface of a first substrate; and b.1) wiping the applied composition off of the surface of the first substrate or b.2) allowing a major portion of the water in the composition to evaporate off of the surface of the first substrate. The composition of the invention may be applied by any means well known in the art. It may be applied manually by spraying, brushing, rolling or applying an absorbent material, such as a cloth, containing the composition to the surface of a substrate to which the adhesive will be applied such that a sufficient amount of the composition is applied to the surface. The composition can be applied by hand using an absorbent material such as a felt or sponge applicator, a primer stick or by robotic application, utilizing machines such as automated felt applicator as, e.g., provided by Nordson Deutschland GmbH, Erkrath, Germany or automated spray application equipment as e.g., provided by SCA Schucker GmbH, Bretten-Gölshausen, Germany or the M710I robotic system or available from Fanuc Robotics America, of Rochester Hills, Mich. used with an automated primer dispense applicator supplied by Nordson Corporation, Amherst, Ohio. In one embodiment the composition of the invention is applied and the water is allowed to evaporate away from the surface of the substrate. In another embodiment, an absorbent material, such as described hereinbefore, is wiped over the substrate to which the composition of the invention is applied. Generally, this results in removal of the water and leaves some of the hydrolyzed alkoxysilyl amine and the one of more alkoxylated alcohols, fatty acids or fatty acid esters on the surface of the first substrate. The process of the invention may further comprise c) contacting the first substrate with an adhesive, preferably containing a prepolymer having isocyanate, a silane, or both functional groups, and a second substrate such that the adhesive is disposed between the first and the second substrates, wherein the adhesive is applied to the portion of the surface of the first substrate to which the water based primer composition of the invention is applied. In the embodiment wherein water is allowed to evaporate away, the adhesive can be applied after sufficient time such that the adhesive durably bonds to the surface of the substrate. Preferably the flash time, that is the time the water is allowed to evaporate away, for at least 60 seconds, more preferably at least 20 seconds, and most preferably at least 10 seconds. In a preferred embodiment, the composition of the invention preferably enhances adhesion after application and before adhesive application for 30 days or less, more preferably 7 days or less, more preferably 3 days or less and even more preferably 60 minutes or less. Preferably, the process of the present invention further comprises d) the step of exposing the adhesive to curing conditions.

The system of the invention is used to bond porous and nonporous substrates together. To affect bonding, the adhesive is applied to a surface of the first substrate, a surface of the second substrate, or surfaces of both substrates and the first substrate is thereafter contacted with a second substrate. In a preferred embodiment, one substrate is glass the other substrate is a plastic, metal, fiberglass or composite substrate (for instance cured sheet molding compound) which may optionally be painted.

Preferably the system of the invention can be used to bond glass or plastic coated with an abrasion resistant coating, to other substrates such as metal or plastics. The coating can comprise any coating which is abrasion resistant such as a polysiloxane coating. Preferably, the coating has an ultraviolet pigmented light blocking additive. Preferably, the glass or plastic window has an opaque coating disposed in the region to be contacted with the adhesive to block UV light from reaching the adhesive. The glass or plastic window preferably has a ceramic enamel or organic frit disposed on a portion of the surface of the glass. The glass or plastic can be flat or shaped. Included in shaped glass or plastic is glass or plastic having a curved surface. Preferably, the glass or plastic is used as a window and the ceramic enamel or organic frit is located about the periphery of the glass or plastic. Preferably, the frit is located about the periphery of the glass or plastic such that it is capable of blocking transmission of light to prevent it from contacting the adhesive, which bonds the window into a structure. The frit on the periphery also hides the trim components disposed about the periphery of the window. The glass or plastic is preferably used as a window and preferably used as a window in an automobile. The second substrate is preferably a window frame or a flange of a vehicle adapted to hold a window in place.

In general, the method of bonding glass or plastic, such as a window, to a substrate comprises, applying an adhesive to the surface of the glass or plastic along the portion of the glass which is to be bonded to the structure which has the water based primer composition of the present invention thereon. Where a ceramic enamel or organic frit is present the adhesive is applied to the surface of the frit. The adhesive is thereafter contacted with the second substrate such that the adhesive is disposed between the window and the second substrate. The adhesive is allowed to cure to form a durable bond between the window and the substrate. Generally, the adhesive is applied at ambient temperature in the presence of atmospheric moisture. Typically, exposure to atmospheric moisture is sufficient to result in curing of the adhesive. Curing may be further accelerated by applying heat to the curing adhesive by means of convection heat or microwave heating. Typically the adhesive is applied as a bead having an engineered cross-sectional shape. In the embodiment wherein one of the substrates is to be used as a window the bead is applied around the periphery of the substrate in a manner such that the beginning of the adhesive bead is knitted, contacted with, the end of the bead. This is performed in a manner such that the adhesive bead when cured functions to seal around the periphery of the substrate, such as a window. This is why such adhesive are often referred to as sealants.

In a preferred embodiment of the above mentioned process, the first substrate is glass or glass having a ceramic or organic frit on the portion of the surface which is bonded to a second substrate. In another preferred embodiment of the above mentioned process, the glass substrate is a window and the second substrate is a flange in a vehicle adapted to hold the window in place in the vehicle or the substrate is a window frame in a building.

As used herein, the term "durable bond" refers to the bond of the adhesive to the substrate surface wherein the bond lasts for a significant portion of the life, or the entire life, of the structure. The durability of a bond is typically predicted utilizing accelerated aging tests. For purposes of this invention, the cataplasm test is used. The water based primer composition of the invention is applied by saturating a cheesecloth with the solution and applying a thin wet coating to the window surface. Twenty seconds after the application, an adhesive is applied in a bead of 8 to 10 mm in width and 6 to 8 mm in thickness down the length of the substrate. The adhesive is allowed to cure for 7 days at 23° C. and 50 percent Relative Humidity (RH), then the sample is subjected into the cataplasm test. After the desired exposure the samples are tested utilizing the quick knife adhesion test. The results are listed as the percent of cohesive failure (failure within the urethane adhesive) with the desired result being 100 percent CF (cohesive failure). The long-term durability is expressed as the number of days required to lose 100 percent CF. As used herein, a durable bond means that the adhesive under the above-mentioned test exhibits a performance of 5 days or greater, more preferably 6 days or greater and most preferably 8 days or greater.

Any numerical values recited in the above application include all values from the lower value to the upper value in increments of one unit provided that there is a separation of at least 2 units between any lower value and any higher value. As an example, if it is stated that the amount of a component or a value of a process variable such as, for example, temperature, pressure, and time is, for example, from 1 to 90, preferably from 20 to 80, more preferably from 30 to 70, it is intended that values such as 15 to 85, 22 to 68, 43 to 51, to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner. Unless otherwise stated, all ranges include both endpoints and all numbers between the endpoints. Thus, "20 to 30" is inclusive of at least the specified endpoints. Weight percent as used herein refers to compositions containing 100 parts by weight. The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of the elements, ingredients, components or steps. Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

Examples

Examples 1 and 2 are prepared via the slow addition of 6 g of DYNASYLAN™ HYDROSIL 1151 (alkoxysilyl amine 2) and 0.1 g ECOSURF SA7, Silquest A1230 respectively to 98 g of de-mineralized water under continuous stirring at ambient temperature.

Examples 3 to 5 are prepared by the slow addition of a 1 wt % solution of the alkoxysilyl amine to a 6 wt % solution of the titanate under vigorous stirring at ambient temperature. Volumes of the solutions are chosen to give the recipe composition described in Table 1. 0.05 wt % of the surfactant is added to Examples 4 and 5 after the mixture of solutions of alkoxysilyl amine and titanate.

Examples 6 to 12 are prepared by diluting the alkoxysilyl amine with water then adding the neat titanate to aqueous solutions under stirring at ambient temperature. The surfactant of example 8 is added after the mixing of the alkoxysilyl amine and the titanate.

Examples 13 to 19 are prepared by diluting the titanate and zirconates in a first step and consecutively addition of the alkoxysilyl amines under stirring at ambient temperature. The titanate in Example 19 is added to the mixture of the alkoxysilyl amine and zirconate under stirring at ambient temperature. In all examples 13 to 19, the surfactant is added as last process step under stirring at ambient temperature.

The water based primer composition for Examples 1 to 19 are given below in Table 1, amounts are in weight percent based on a total of 100 parts with water making up the balance for each composition. The weight percents for the organotitanates, organozirconates, surfactants, and alkoxysilyl amines are based on the total weight of the water based primer composition. In Table 1:

"Alkoxysilyl Amine-1" is an aqueous solution of an amino-modified polysiloxane available as DYNASILAN HYDROSIL™ 2776 from Evonik;

"Alkoxysilyl Amine-2" is an aqueous solution of an amino-modified polysiloxane available as DYNASILAN HYDROSIL 1151 from Evonik;

"Surfactant-1" is an alkoxy end-capped polyethylene oxide available as ECOSURF SA7 from The Dow Chemical Co.;

"Surfactant-2" is a polyalkylenoxidalkoxysilane available as SILQUEST A1230 from Momentive;

"Zirconate-1" is a tetrakis(triethanolaminato)zirconium (IV) available as TYZOR TEAZ from Dorf Ketal having the structure:

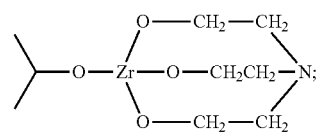

"Titanate-1" is tetrakis(triethanolaminato)titanium(IV) available as TYZOR TE from Dorf Ketal having the structure:

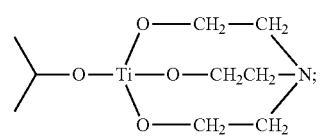

"Titanate-2" is 2-propanolato, tris(3,6-diaza)hexanolato-titanium(IV) available as KR 44 from Kenrich having the structure:

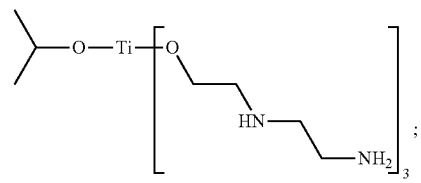

and

"Titanate-3" is dihydroxybis(ammonium-lactato)titanium available as TYZOR LA from Dorf Ketal having the structure:

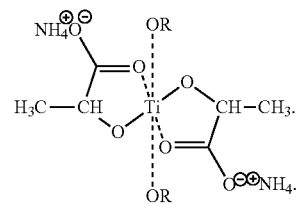

TABLE 1

| Example | Zirconate-1, Zi wt % | Titanate-1, Ti wt % | Titanate-2, Ti wt % | Titanate-3, Ti wt % | Alkoxysilyl Amine-1, wt % | Alkoxysilyl, Amine-2, wt % | Surfactant-1, wt % | Surfactant-2, wt % |
|---|---|---|---|---|---|---|---|---|
| 1* | | | | | | 6 | 0.1 | |
| 2* | | | | | | 6 | | 0.1 |
| 3 | | | | 6 | | 6 | | 0.05 |
| 4 | | | | 1 | | 6 | | 0.05 |
| 5 | | | | 6 | | 1 | | |
| 6 | | | 0.05 | | 3 | | | |
| 7 | | | 0.5 | | 3 | | | |
| 8 | | | 0.6 | | 3.1 | | 0.1 | |
| 9 | | | 0.1 | | 6 | | | |
| 10 | | | 0.5 | | 6 | | | |
| 11 | | | 1 | | 6 | | | |
| 12 | | | 3 | | 1 | | | |
| 13 | | 0.1 | | | 5 | | 0.1 | |
| 14 | 0.1 | | | | 5 | | 0.3 | |
| 15 | | 1.0 | | | 6 | | 0.1 | |
| 16 | 1 | | | | 6 | | 0.3 | |
| 17 | | 3 | | | 2 | | 0.1 | |

TABLE 1-continued

| Example | Zirconate-1, Zi wt % | Titanate-1, Ti wt % | Titanate-2, Ti wt % | Titanate-3, Ti wt % | Alkoxysilyl Amine-1, wt % | Alkoxysilyl, Amine-2, wt % | Surfactant-1, wt % | Surfactant-2, wt % |
|---|---|---|---|---|---|---|---|---|
| 18 | 3 | | | | | 4 | | 0.1 |
| 19 | 3.8 | | 0.1 | | 2 | 6 | | 0.1 |

*not examples of the present invention

Test Results:
Storage Stability

Storage stability of is determined by visual inspection of the samples for flocculation and sedimentation and on basis of pH measurements and is determined for samples stored at room temperature (23° C., 50 percent relative humidity) and samples stored at elevated temperatures (40° C., 50 percent relative humidity) for specified amounts of time. Test results are summarized in Table 2. Acceptable storage stability is defined by complete absence of any precipitate and a clear, non-turbid appearance of the solution. Furthermore, samples need to be colorless. The pH value should not change by more than 5% over the required storage period.

Adhesion

"Sample Preparation" is accomplished by applying a water based primer through a plastic foam fitted on an application bottle, without pre-cleaning the glass/coated glass, to one or more of 6 different automobile wind screens (numbered 1 to 6) and are either directly to glass pre-coated with an enamel coating (numbered 1, 2, 3, or 4). When the glass is pre-coated, the water based primer is applied to the coating (enamel or ceramic). The application is applied in a wiped on manner and allowed to air dry for a specified amount of time (open time). Thereafter, a silanated isocyanate functional adhesive is applied to the surface to which the water based primer is applied, as described in the quick knife adhesion test. Peel adhesion tests results are summarized in Table 3. In Table 3:

"BETASEAL™ 1" is a partially silanated, high modulus polyurethane adhesive available from The Dow Chemical Co. and "BETASEAL 2" is a partially silanated, mid range modulus polyurethane adhesive available from The Dow Chemical Co.

In Table 3, the following test used to determine adhesion:

"Exposure Cycle" is defined in GEX method 90 and comprises (1) 7 days at 23° C. at 50 percent relative humidity (% rh), (2) plus 7 days in water at 23° C., (3) 7 days of cataplasm, and (4) an additional 7 days of cataplasm. Cataplasma treatment is the surrounding of the sample with cotton and saturating the cotton packaging with water, wrapping the wet cotton wrapped sample in aluminum foil and PE foil to avoid evaporation. The packed sample is exposed for 7 days at 70° C., then 16 h at −20° C., then brought to ambient temperature (23° C.) and the unwrapped sample is stored for 2 hours at 23° C.

Adhesion testing may be performed after one or more segments of the cataplasm exposure cycle.

"Quick Knife Test" is performed as described: Briefly, a water based primer composition is applied on a cleaned plastic or glass/enamel substrate with a standardized applicator After a defined flash-off time, an adhesive bead with a defined geometry, typically 10 mm (height)×10 to 15 mm (width)×200 mm (length) is applied. The adhesive bead is compressed by covering the entire bead surface with a PE foil and compressing the bead manually with a wooden spatula to a height of about 6 mm. The samples are exposed on basis of defined exposure cycle herein above.

"Performance Evaluation" is preformed as described: The adhesive bead is cut along (parallel to) the surface of the substrate for approximately 10 mm so that it may be peeled off at a 90° angle. Approximately every 10 mm, the peeled off bead is cut with a knife to the substrate and peeling off is continued The peeled samples are rated according to the percent (%) of cohesive failure, meaning failure within the hardened bulk of the adhesive, subjective evaluations are given the following numerical values: 1=no (0%) cohesive failure, 1=less than 25% cohesive failure, 3=less than 50% cohesive failure, 4=less than 75% cohesive failure and 5=complete (100%) cohesive failure. A minus sign ("−") in front of the integer number means the % cohesive failure is reduced by 5 percentage points, for example −5 represents a value of 95% cohesive failure, −4 represents 70% cohesive failure, etc. Additional descriptors may be used, including "a"=adhesive with or without primer exhibits delaminating from the substrate and "b"=adhesive exhibits delaminating from the primer, "z"=Adhesive failure at both edges (left and right side) of the adhesive bead, and "e"=tacky interface between either adhesive/primer or adhesive/substrate. Peel adhesion test results with an evaluation of 4 or greater (equal to or greater than 75% cohesive failure) fulfill application requirements.

Example 20 utilizes a commercially available non-titanate/zirconate containing silane modified water based primer available as BETAWIPE™ HYDRO from The Dow Chemical Co. Adhesion comparisons between Example 20 and Example 18 are shown in Table 4.

TABLE 2

| | Appearance (precipitation) | | | Appearance (colorless/clear) | | | pH | | |
|---|---|---|---|---|---|---|---|---|---|
| Example | 3 d @ 40° C. | 2 mo @ 40° C. | 6 mo 23° C. | 3 d @ 40° C. | 2 mo @ 40° C. | 6 mo 23° C. | 3 d @ 40° C. | 2 mo @ 40° C. | 6 mo 23° C. |
| 8 | precipitation | — | — | precipitation | — | — | — | — | — |
| 9 | no | no | no | colorless | colorless | colorless | 10.79 | 10.63 | 10.87 |
| 16 | no | no | no | colorless | colorless | colorless | 11 | 11.07 | 11.07 |
| 17 | precipitation | — | — | — | — | — | — | — | — |
| 18 | no | no | no | colorless | colorless | colorless | 9.57 | 9.49 | 9.6 |
| 19 | no | no | no | colorless | colorless | colorless | 11.05 | 11.15 | 11.1 |

TABLE 3

| Example | Wind Screen | Bonding Surface | Open Time, min | Adhesive | 7 d, 23° C. & 50% rh | +7 d, Cataplasma |
|---|---|---|---|---|---|---|
| 9 | model 5 | glass 5 | 1 | BETASEAL 2 | 4a | 5 |
| 9 | model 5 | enamel 3 | 1 | BETASEAL 2 | 5 | 4-5a |
| 9 | model 5 | enamel 3 | 1 | BETASEAL 1 | 5 | −5a |
| 14 | model 1 | glass 1 | 2 | BETASEAL 1 | −5a | 4a |
| 14 | model 1 | enamel 1 | 2 | BETASEAL 1 | 5 | 5 |
| 14 | model 1 | glass 1 | 2 | BETASEAL 1 | −5z | 5 |
| 14 | model 2 | glass 2 | 2 | BETASEAL 1 | 5 | −5a |
| 16 | model 2 | enamel 4 | 1 | BETASEAL 2 | 5 | 5 |
| 16 | model 3 | glass 3 | 1 | BETASEAL 2 | 5 | 5 |
| 18 | model 1 | enamel 1 | 1 | BETASEAL 2 | 5 | 5 |
| 18 | model 4 | glass 4 | 1 | BETASEAL 2 | 5 | 5 |
| 18 | model 4 | enamel 2 | 1 | BETASEAL 2 | 5 | 5 |
| 18 | model 4 | enamel 2 | 1 | BETASEAL 1 | 5 | 5 |
| 18 | model 5 | glass 5 | 1 | BETASEAL 2 | 5 | 5 |
| 18 | model 1 | enamel 1 | 1 | BETASEAL 2 | 5 | −5z |
| 19 | model 1 | glass 1 | 1 | BETASEAL 2 | 5 | −5z |
| 19 | model 1 | glass 1 | 1 | BETASEAL 1 | 5 | 5 |
| 19 | model 1 | enamel 1 | 1 | BETASEAL 2 | 4-5a | 5 |
| 19 | model 1 | enamel 1 | 1 | BETASEAL 1 | 5 | 5 |

TABLE 4

| Example | Wind Screen | Bonding Surface | Open Time, min | Adhesive | 7 d, 23° C. & 50% rh | +7 d, Cataplasma | +2nd 7 d, Cataplasma |
|---|---|---|---|---|---|---|---|
| 18 | model 6 | enamel 7 | 1 | BETASEAL 1 | 5 | −5z | 5 |
| 20* | model 6 | enamel 7 | 1 | BETASEAL 1 | 5 | −5a | 3 |
| 18 | model 4 | enamel 2 | 1 | BETASEAL 1 | 5 | 5 | 5 |
| 20* | model 4 | enamel 2 | 1 | BETASEAL 1 | 4z | 4a | 1a |
| 18 | model 5 | enamel 3 | 1 | BETASEAL 1 | 5 | 5 | 4a |
| 20* | model 5 | enamel 3 | 1 | BETASEAL 1 | 5 | 5 | 1-2a |

*not an example of the present invention

The invention claimed is:

1. A water based primer composition comprising:
   a. a hydrosylate of one or more alkoxysilyl amine wherein the one or more alkoxysilyl amines comprise one or more alkoxysilyl alkyl amines, alkoxysilyl polyalkylamines or bis(alkoxysilyl) amines;
   b. a surfactant;
   c. an organotitanate, organozirconate, or combinations thereof;
   d. optionally a fluorescing compound; and
   e. water;
   wherein the alkoxysilyl alkyl amines correspond to the formula:

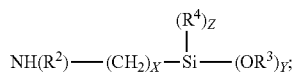

the alkoxysilyl polyalkylamines correspond to the formula:

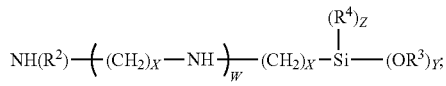

and the bis(alkoxysilyl) amines correspond to the formula:

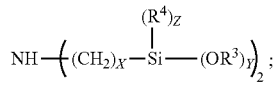

wherein:
   $R^2$ is separately in each occurrence a $C_{1-20}$ hydrocarbyl group;
   $R^3$ is separately in each occurrence a $C_{1-4}$ alkyl group;
   $R^4$ is separately in each occurrence a $C_{1-4}$ alkyl group;
   w is separately in each occurrence an integer of from 1 to 10;
   x is separately in each occurrence an integer of from 1 to 4;
   y is separately in each occurrence an integer of from 1 to 3; and
   z is separately and integer of from 0 to 2 provided that z=3−y.

2. The composition of claim 1 wherein:
   a. the hydrosylate of one or more alkoxysilyl amine is present in an amount of from 0.05 to 10 weight percent based on the total weight of the water based primer composition;
   b. the surfactant is present in an amount of from 0.05 to 1.0 weight percent based on the total weight of the water based primer composition;
   c. the organotitanate, is present in an amount of from 0.001 to 3.0 weight percent and/or the organozirconate is present in an amount of from 0.001 to 2.0 weight percent, wherein the titanate and zirconate weight percent is based on the weight of the titanium and zirconium, respectively, relative to the total weight of the water based primer composition;
d. the fluorescing compound is present in an amount of from 0.0 to 1.0 weight percent based on the total weight of the water based primer composition; and
e. the balance of the composition is water,
where in the total weight of the water based primer composition is 100 parts by weight.

3. The composition according claim 1 wherein the organotitanate or organozirconate correspond to formula:

wherein M is titanium or zirconium and $R^8$ comprises hydrocarbyl ligands, which may optionally contain one or more heteroatoms comprising oxygen, nitrogen, sulfur or phosphorus, optionally two or more of $R^8$ may combine to form a cyclic ring structure.

4. The composition according to claim 3 wherein $R^8$ is independently in each occurrence alkylcarboxyl, alkenylcarboxyl, aryl or aralkylsulfonyl, alkylamino, polyalkylamino, phosphato-alkyl, pyrophosphato-alkyl or two or more of $R^8$ may combine to form an alklyene or carbonyl alkylene containing ring.

5. The composition according to claim 4 wherein the organotitanate or organozirconate is selected from isopropyl triisostearoyl titanate, isopropyltri(dodecyl)benzene sulfonyl titanate, isopropyl tri (n-ethylenediamino)ethyl titanate, octylene glycol titanate, (tetrakis) 2-ethylhexane-1,3-(diolato) titanate, 2-ethylhexyl titanate, dihydroxybis(ammonium-lactato)titanium, tetrakis(triethanolaminato)titanium (IV), or tetrakis(triethanolaminato)zirconium(IV).

6. A process comprising the steps of:
i) applying a water based primer composition according to claim 1 to a portion of a surface of a first substrate
ii) wiping the applied composition off of the surface of the first substrate or allowing a major portion of the water in the composition to evaporate off of the surface of the first substrate; and
iii) contacting the first substrate with an adhesive and contacting the adhesive to a second substrate such that the adhesive is disposed between the first and the second substrates, wherein the adhesive is applied to the portion of the surface of the first substrate to which the water based primer composition is applied.

7. A process according to claim 6 wherein the first substrate is a glass substrate, having a ceramic or organic frit on the portion of the surface which is bonded to the second substrate, wherein the second substrate is selected from a plastic, a coated plastic, a bare metal, a coated metal, or a painted metal.

8. A process according to claim 7 where in the glass substrate is a window and the second substrate is a flange in a vehicle adapted to hold the window in place in the vehicle or the second substrate is a window frame in a building.

9. A process according to claim 6 wherein the organotitanate or organozirconate is selected from isopropyl triisostearoyl titanate, isopropyltri(dodecyl)benzene sulfonyl titanate, isopropyl tri (n-ethylenediamino)ethyl titanate, octylene glycol titanate, (tetrakis) 2-ethylhexane-1,3-(diolato) titanate, 2-ethylhexyl titanate, dihydroxybis(ammonium-lactato)titanium, tetrakis(triethanolaminato)titanium (IV), or tetrakis(triethanolaminato)zirconium(IV).

10. A water based primer composition comprising:
a. a hydrosylate of one or more alkoxysilyl amine wherein the one or more alkoxysilyl amines comprise one or more alkoxysilyl alkyl amines, alkoxysilyl polyalkylamines or bis(alkoxysilyl) amines;
b. a surfactant;
c. an organotitanate, organozirconate, or combinations thereof;
d. optionally a fluorescing compound; and
e. water;
wherein the alkoxysilyl alkyl amines correspond to the formula:

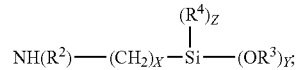

the alkoxysilyl polyalkylamines correspond to the formula:

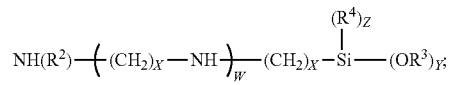

and the bis(alkoxysilyl) amines correspond to the formula:

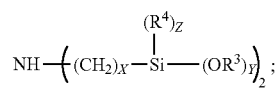

wherein:
$R^2$ is separately in each occurrence a $C_{1-20}$ hydrocarbyl group;
$R^3$ is separately in each occurrence a $C_{1-4}$ alkyl group;
$R^4$ is separately in each occurrence a $C_{1-4}$ alkyl group;
w is separately in each occurrence an integer of from 1 to 10;
x is separately in each occurrence an integer of from 1 to 4;
y is separately in each occurrence an integer of from 1 to 3; and
z is separately and integer of from 0 to 2 provided that z=3−y; and
wherein the organotitanate or organozirconate is selected from isopropyl triisostearoyl titanate, isopropyltri(dodecyl)benzene sulfonyl titanate, isopropyl tri (n-ethylenediamino)ethyl titanate, octylene glycol titanate, (tetrakis) 2-ethylhexane-1,3-(diolato) titanate, 2-ethylhexyl titanate, dihydroxybis(ammonium-lactato)titanium, tetrakis(triethanolaminato)titanium(IV), or tetrakis(triethanolaminato)zirconium(IV).

* * * * *